United States Patent
Ha

(10) Patent No.: US 12,249,026 B2
(45) Date of Patent: Mar. 11, 2025

(54) METHOD AND APPARATUS FOR LIGHT ESTIMATION

(71) Applicant: Samsung Electronics Co., Ltd., Suwon-si (KR)

(72) Inventor: Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 17/699,629

(22) Filed: Mar. 21, 2022

(65) Prior Publication Data

US 2023/0019751 A1  Jan. 19, 2023

(30) Foreign Application Priority Data

Jul. 13, 2021 (KR) .......................... 10-2021-0091604

(51) Int. Cl.
  *G06T 15/80* (2011.01)
  *G06T 7/70* (2017.01)
  *G06T 15/60* (2006.01)

(52) U.S. Cl.
  CPC .............. *G06T 15/80* (2013.01); *G06T 7/70* (2017.01); *G06T 15/60* (2013.01); *G06T 2207/20081* (2013.01)

(58) Field of Classification Search
  None
  See application file for complete search history.

(56) References Cited

U.S. PATENT DOCUMENTS

| | | | |
|---|---|---|---|
| 5,966,134 A | * | 10/1999 | Arias ...................... G06T 15/60 |
| | | | 345/589 |
| 9,041,829 B2 | | 5/2015 | Venkataraman et al. |
| 9,129,377 B2 | | 9/2015 | Ciurea et al. |
| 9,576,369 B2 | | 2/2017 | Venkataraman et al. |
| 10,665,011 B1 | | 5/2020 | Sunkavalli et al. |
| 10,950,036 B2 | | 3/2021 | Ha et al. |
| 2016/0063757 A1 | * | 3/2016 | Yang ....................... G06T 15/60 |
| | | | 345/426 |
| 2018/0359416 A1 | | 12/2018 | Hold-Geoffroy et al. |

(Continued)

FOREIGN PATENT DOCUMENTS

WO  WO 2020/102771 A1  5/2020

OTHER PUBLICATIONS

Legendre, Chloe, et al. "Deeplight: Learning illumination for unconstrained mobile mixed reality." Proceedings of the IEEE/CVF Conference on Computer Vision and Pattern Recognition. 2019 (Year: 2019).*

(Continued)

*Primary Examiner* — Nurun Flora
(74) *Attorney, Agent, or Firm* — NSIP Law

(57) ABSTRACT

A processor-implemented method for light estimation includes: estimating light information corresponding to an input image using a light estimation model; detecting a reference object in the input image; determining object information of the reference object and plane information of a reference plane supporting the reference object; rendering a virtual object corresponding to the reference object based on the light information, the object information, and the plane information; and training the light estimation model by updating the light estimation model based on a result of comparing the reference object and the rendered virtual object.

27 Claims, 9 Drawing Sheets

(56) References Cited

U.S. PATENT DOCUMENTS

| | | |
|---|---|---|
| 2020/0302684 A1 | 9/2020 | Sunkavalli et al. |
| 2021/0004974 A1 | 1/2021 | Guizilini et al. |
| 2021/0027526 A1 | 1/2021 | Dong et al. |
| 2021/0073955 A1 | 3/2021 | Zhang et al. |

OTHER PUBLICATIONS

Illumi Net: Transferring Illumination from Planar Surfaces to Virtual Objects in Augmented Reality. arXiv preprint arXiv:2007.05981 (2020) (Year: 2020).*

Gardner, Marc-André, et al. "Deep Parametric Indoor Lighting Estimation." *Proceedings of the IEEE/CVF International Conference on Computer Vision* 2019 (9 pages in English).

Yu, Ye, et al. "Depth estimation meets inverse rendering for single image novel view synthesis." *European Conference on Visual Media Production* Dec. 17, 2019 (8 pages in English).

Dib, Abdallah, et al. "Towards High Fidelity Monocular Face Reconstruction with Rich Reflectance using Self-supervised Learning and Ray Tracing." *Proceedings of the IEEE/CVF International Conference on Computer Vision* arXiv:2103.15432v1 Mar. 29, 2021 (20 pages in English).

Chen, Lele, et al. "High-fidelity Face Tracking for AR/VR via Deep Lighting Adaptation." Proceedings of the *IEEE/CVF Conference on Computer Vision and Pattern Recognition* arXiv:2103.15876v1 Mar. 29, 2021 (12 pages in English).

Somanath, Gowri, et al. "HDR Environment Map Estimation for Real-Time Augmented Reality." *Proceedings of the IEEE/CVF Conference on Computer Vision and Pattern Recognition* 2021 (9 pages in English).

Li, Boyun, et al. "You only look yourself: Unsupervised and untrained single image dehazing neural network." *International Journal of Computer Vision* vol. 129 Issue 5. arXiv:2006.16829v1 2021: (13 pages in English).

Legendre, Chloe et al., "DeepLight: Learning Illumination for Unconstrained Mobile Mixed Reality," arXiv: 1904.01175v1, 2019, (11 Pages in English).

Karsch, Kevin, "Inverse Rendering Techniques For Physically Grounded Image Editing," arXiv: 2001.00986v1, 2019, (158 Pages in English).

Park, Jinwoo et al., "Physically-Inspired Deep Light Estimation from a Homogeneous-Material Object for Mixed Reality Lighting," IEEE Transactions on Visualization and Computer Graphics, vol. 26, No. 5, May 2020, (10 Pages in English).

Xu, Di et al., "IllumiNet: Transferring Illumination from Planar Surfaces to Virtual Objects in Augmented Reality," arXiv: 2007.05981v1, 2020, (10 Pages in English).

Extended European Search Report Issued on Nov. 21, 2022, in counterpart European Patent Application No. 22171442.1 (9 Pages in English).

* cited by examiner

METHOD AND APPARATUS FOR LIGHT ESTIMATION

CROSS-REFERENCE TO RELATED APPLICATIONS

This application claims the benefit under 35 USC § 119(a) of Korean Patent Application No. 10-2021-0091604, filed on Jul. 13, 2021 in the Korean Intellectual Property Office, the entire disclosure of which is incorporated herein by reference for all purposes.

BACKGROUND

1. Field

The following description relates to a method and apparatus with light estimation.

2. Description of Related Art

Light estimation may be a technique for estimating light illuminating a scene. Estimated light information may be used to render a virtual object in a corresponding image or space. For example, the estimated light information may be applied to a virtual object in augmented reality (AR) or computer graphics (CG). The more accurately the light information is estimated, the more realistic the virtual object may be. A machine learning-based model may be used for light estimation. The model may be trained using clues such as ambient light, shadings, specular highlights, and reflections.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method for light estimation includes: estimating light information corresponding to an input image using a light estimation model; detecting a reference object in the input image; determining object information of the reference object and plane information of a reference plane supporting the reference object; rendering a virtual object corresponding to the reference object based on the light information, the object information, and the plane information; and training the light estimation model by updating the light estimation model based on a result of comparing the reference object and the rendered virtual object.

The rendering may include rendering a shading of the virtual object and a shadow of the virtual object.

The result of comparing may include a result of comparing pixel data representing a shading of the reference object and a shadow of the reference object and pixel data representing a shading of the virtual object and a shadow of the virtual object.

The object information may include any one or any combination of any two or more of a pose, a shape, and a material of the reference object, and the plane information may include any one or any combination of any two or more of a pose, a shape, and a material of the reference plane.

The determining may include, in response to the reference object being determined as a known object, determining at least a portion of the object information using an object database.

The determining may include, in response to the reference object and the reference plane being determined as a known combined structure, determining at least a portion of the object information and the plane information using an object database.

A spherical partial structure corresponding to the reference object and a flat partial structure corresponding to the reference plane may be combined to form the combined structure.

The determining may include, in response to the reference plane being determined as an unknown plane, determining the plane information by detecting the reference plane in the input image.

The determining may include, in response to the reference object being determined as an unknown object, determining the object information based on information of a predetermined proxy object.

The rendering may include: determining shadow information of each sampling point of the reference plane by fusing light information and visibility information of each sampling point; and rendering a shadow of the virtual object by projecting the shadow information of each sampling point of the reference plane onto a capture view of the input image.

In response to the reference object and the reference plane being determined as a known combined structure, the visibility information may be predetermined for rendering a shadow of the combined structure.

The updating may include updating the light estimation model to reduce a difference between the reference object and the virtual object.

The method may include: obtaining another image; and estimating light information corresponding to the other image using the trained light estimation model.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus for light estimation includes: one or more processors configured to: estimate light information corresponding to an input image using a light estimation model, detect a reference object in the input image, determine object information of the reference object and plane information of a reference plane supporting the reference object, render a virtual object corresponding to the reference object based on the light information, the object information, and the plane information, and train the light estimation model by updating the light estimation model based on a result of comparing the reference object and the rendered virtual object.

For the rendering, the one or more processors may be configured to render a shading of the virtual object and a shadow of the virtual object, and the result of comparing may include a result of comparing pixel data representing a shading of the reference object and a shadow of the reference object and pixel data representing a shading of the virtual object and a shadow of the virtual object.

For the rendering, the one or more processors may be configured to: determine shadow information of each sampling point of the reference plane by fusing light information and visibility information of each sampling point, and render the shadow of the virtual object by projecting the shadow information of each sampling point of the reference plane onto a capture view of the input image.

For the determining, the one or more processors may be configured to determine the object information based on information of a predetermined proxy object.

For the updating, the one or more processors may be configured to update the light estimation model to reduce a difference between the reference object and the virtual object.

In another general aspect, an electronic device includes: a camera configured to generate an input image; and one or more processors configured to: estimate light information corresponding to the input image using a light estimation model, detect a reference object in the input image, determine object information of the reference object and plane information of a reference plane supporting the reference object, render a virtual object corresponding to the reference object, a shading of the virtual object, and a shadow of the virtual object based on the light information, the object information, and the plane information, and train the light estimation model by updating the light estimation model based on a result of comparing pixel data representing a shading of the reference object and a shadow of the reference object and pixel data representing the shading of the rendered virtual object and the shadow of the rendered virtual object.

For the determining, the one or more processors may be configured to determine the object information based on information of a predetermined proxy object.

In another general aspect, a processor-implemented method for light estimation includes: obtaining a second image; and estimating second light information corresponding to the second image using a trained light estimation model, wherein the light estimation model is trained by estimating light information corresponding to an input image using a light estimation model, detecting a reference object in the input image, determining object information of the reference object and plane information of a reference plane supporting the reference object, rendering a virtual object corresponding to the reference object based on the light information, the object information, and the plane information, and updating the light estimation model based on a result of comparing the reference object and the virtual object.

The method may include: rendering a second virtual object corresponding to a second object in the second image, based on the second light information; and superimposing the second virtual object on the second image to generate an augmented reality (AR).

In another general aspect, a processor-implemented method for light estimation includes: estimating light information corresponding to an input image using a light estimation model; determining information of a reference object in the input image based on whether stored information corresponds to the reference object; rendering a virtual object corresponding to the reference object based on the light information and the information of the reference object; and training the light estimation model by updating the light estimation model by comparing the reference object and the rendered virtual object.

The stored information may be of a predetermined object, and the determining may include determining the stored information to be the information of the reference object in response to the reference object corresponding to the predetermined object.

The determining may include, in response to the stored information corresponding to the reference object, determining the stored information to be the information of the reference object.

The information of the reference object may include either one or both of object information of the reference object and plane information of a reference plane supporting the reference object.

Other features and aspects will be apparent from the following detailed description, the drawings, and the claims.

Figure 1:
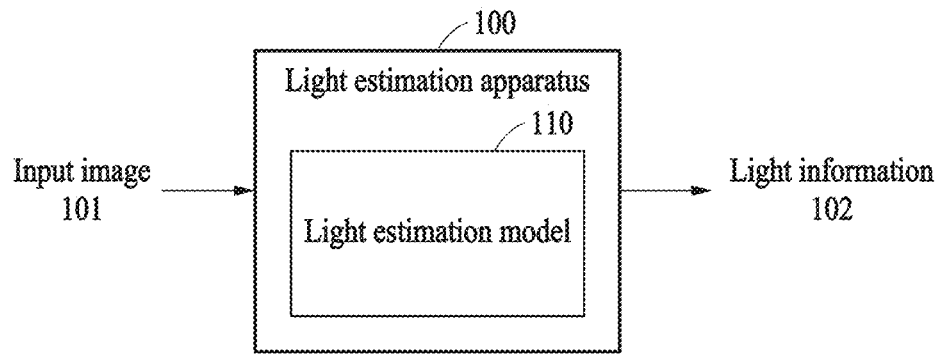
FIG. 1 illustrates an example of a light estimation operation using a light estimation model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises," "includes," and "has" specify the presence of stated features, numbers, integers, steps, operations, elements, components, and/or combinations thereof, but do not preclude the presence or addition of one or more other features, numbers, integers, steps, operations, elements, components and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a light estimation operation using a light estimation model. Referring to FIG. 1, a light estimation apparatus 100 may receive an input image 101 and output light information 102 corresponding to the input image 101. The input image 101 may be a scene of a predetermined captured view that is viewed from a predetermined capturing point. The input image 101 may correspond to a scene image or a front image.

The light information 102 may include information about all lights affecting the scene of the input image 101. The light information 102 may represent the light of the scene in various forms. For example, the light information 102 may express light in the form of an environment map, or express light using predefined attributes (for example, direction, color, brightness, and/or width, etc.).

The light information 102 may be applied to a virtual object in augmented reality (AR) or computer graphics (CG). For example, when AR is provided by superimposing a virtual object on the input image 101, the light information 102 may be applied to the virtual object such that the virtual object may be expressed on the input image 101 without disharmony. The more accurately the light information 102 expresses the light in the input image 101, the more realistic the virtual object may be.

The light estimation apparatus 100 may generate the light information 102 using a light estimation model 110. The light estimation model 110 may be a machine learning model. For example, the light estimation model 110 may include a deep neural network (DNN) generated based on deep learning.

The DNN may include a plurality of layers, and at least a portion thereof may be configured as various networks such as a fully connected network (FCN), a convolutional neural network (CNN), and a recurrent neural network (RNN). The DNN may have a generalization ability to map input data and output data having a nonlinear relationship based on deep learning.

Model training may require a large amount of training data. For example, ground truth data representing various scene images and lights in the scene images may be required to assign an ability to derive the light information 102 from the input image 101. It may take a lot of time and effort to secure such a large amount of training data.

The light estimation model 110 may be trained through self-supervised learning based on image rendering. When the light estimation model 110 generates a light estimation result for a given scene image, image rendering may be performed based on the light estimation result, and a training method of one or more embodiments may train the light estimation model 110 to reduce a difference between the scene image and the rendering result. This training method of one or more embodiments may train the light estimation model 110 without using ground truth data, and thus may greatly reduce the effort and time required for securing the training data.

Image rendering using an object, a plane, and light may be performed, and a known object, a known plane, and shadow information may be used for image rendering and model training. Such a training method of one or more embodiments may improve the training effect, and the light estimation model 110 may estimate realistic light information 102.

Figure 2:
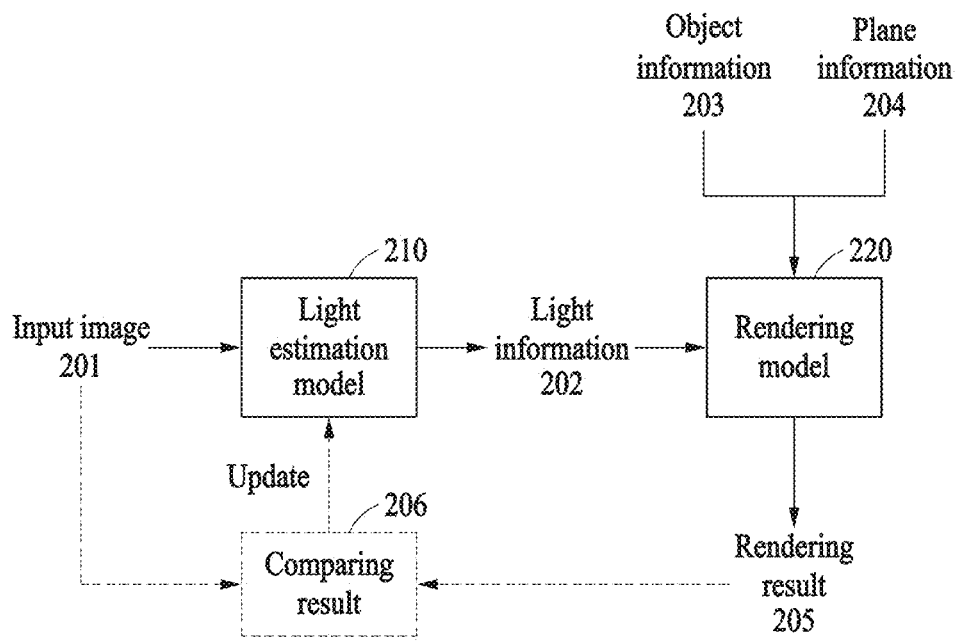
FIG. 2 illustrates an example of training a light estimation model.

FIG. 2 illustrates an example of training a light estimation model. Referring to FIG. 2, a light estimation model 210 may estimate light information 202 corresponding to an input image 201. The light estimation model 210 may be a neural network model including a plurality of layers. At least a portion of the plurality of layers may correspond to CNNs, and at least the other portion thereof may correspond to FCNs. The light information 202 may express light in the form of an environment map, or express light using predefined attributes (for example, direction, color, brightness, and/or width, etc.).

The rendering model 220 may generate a rendering result 205 based on the light information 202, object information 203, and plane information 204. For example, a rendering model 220 may perform neural rendering. The object information 203 may be information about an object in the input image 201, and may include any one or any combination of any two or more of a pose, a shape, and a material of the object. The material may represent a texture, a color, and/or the like. The object in the input image 201 may be referred to as a reference object. The plane information 204 may be information about a reference plane that supports the reference object, and may include any one or any combination of any two or more of a pose (for example, a normal direction), a shape, and a material of the reference plane. The reference object may be detected from the input image 201 through an object detection technique, and at least a portion of the object information 203 and the plane information 204 may be determined based on an object detection result.

The rendering result 205 may include a virtual object corresponding to the reference object. The rendering model 220 may render the virtual object based on the light information 202, the object information 203, and the plane information 204. A comparison result 206 may be determined through a comparison between the reference object and the virtual object, and the light estimation model 210 may be updated (e.g., trained) based on the comparison result 206. A difference between the reference object and the virtual object may correspond to a training loss, and the light estimation model 210 may be updated to reduce the loss, that is, the difference between the reference object and the virtual object. A parameter (for example, a weight) of the light estimation model 210 may be updated through such updating (e.g., training) of the light estimation model 210.

The rendering model 220 may render a shading of the virtual object and a shadow of the virtual object together with the virtual object, and the comparison result 206 may include a result of comparison between pixel data representing a shading of the reference object and a shadow of the reference object and pixel data representing the shading of the virtual object and the shadow of the virtual object. The rendering model 220 may perform shading rendering and shadow rendering at the same time or at different times, and may generate the rendering result 205 by fusing a shading rendering result and a shadow rendering result. A rendering scheme may be applied to the shading rendering, and a rendering scheme according to examples of FIGS. 7 and 8 may be applied to the shadow rendering.

A shading may be used as a clue to light, but it may be difficult to accurately analyze shadings when such shading analysis is performed with a high precision. A shadow may provide a relatively accurate clue to light even when only performed a rough task such as analyzing a direction of generation thereof. The accuracy of shadow rendering may be improved through using the plane information 204. A realistic rendering result 205 may be generated through the shadow rendering, and the model may be updated to be more realistic through shadow comparison.

Information of known objects and/or known planes may be stored in advance in an object database. When a target object and/or the reference plane is a known object and/or a known plane, at least a portion of the object information 203 and/or the plane information 204 may be determined using information from the object database. As such, pre-stored information may be utilized to derive the realistic rendering result 205. For example, when the reference object corresponds to a known object, at least a portion of the object information 203 may be determined using the object database storing information about known objects. The input image 201 may be generated by capturing a known structure in which a predetermined object and a predetermined plane are combined. When the reference object and the reference plane are such a known combined structure, at least a portion of the object information 203 and the plane information 204 may be determined using the object database. When the reference plane is an unknown plane, the plane information 204 may be determined through a plane detection scheme. When the reference object is an unknown object, the object information 203 may be determined based on information on a predetermined proxy object (for example, a cube, a cylinder, a point cloud, etc.). According to examples, a feature (e.g., an object or a plane) may be determined to be a known feature when the feature is determined to correspond to information of a feature stored in a database (e.g., object information of the object or plane information of the plane), and the feature may be determined to be an unknown feature when the feature is determined to not correspond to information of a feature stored in a database.

Figure 3:
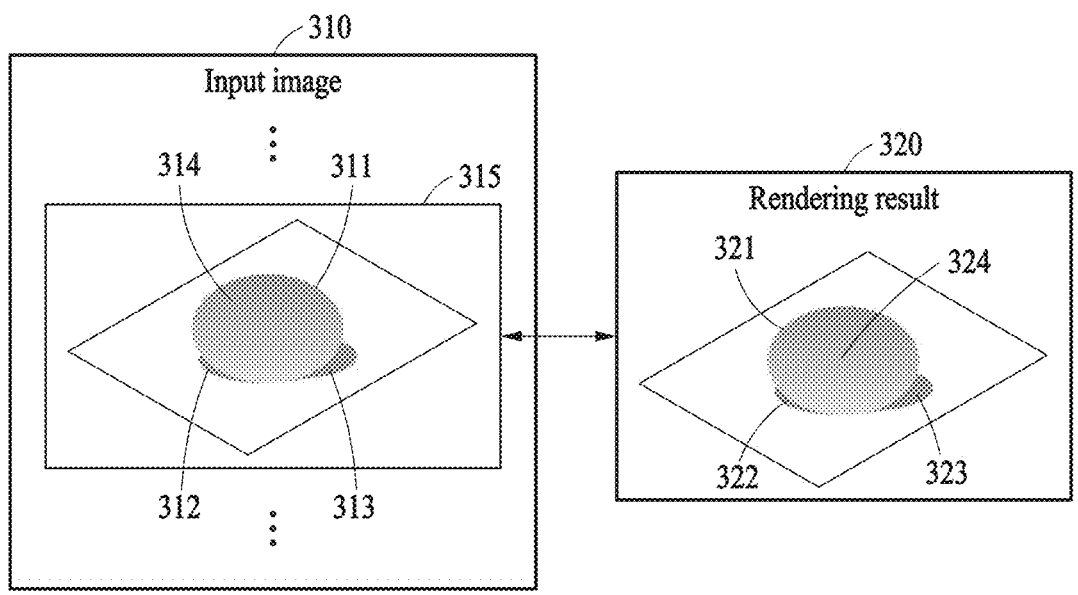
FIG. 3 illustrates an example of com paring an input image and a rendering result.

FIG. 3 illustrates an example of comparing an input image and a rendering result. Referring to FIG. 3, an object region 315 including a reference object 311 may be detected from an input image 310. Object detection may be performed by an object detection model. The object detection model may be a machine learning model (for example, a neural network model) that is trained in advance to generate an object detection result based on the input image 310. The object region 315 may include the reference object 311, a shading 314 of the reference object 311, and shadows 312 and 313 of the reference object 311.

Object information of the reference object 311 may be determined based on the object detection result. The object information may include any one or any combination of any two or more of a pose, a shape, and a material of the reference object 311. The pose may be derived from the object region 315. When the reference object 311 is known, the shape and the material may be determined through the object database, and when the reference object 311 is unknown, the shape and the material may be determined based on information on the proxy object.

When a reference plane of the reference object 311 is known, a shape and a material of the reference plane may be determined through an object database. In the case of a combined structure, a pose of a plane may be determined through a relationship between an object and the plane stored in the object database. The reference object 311 and the reference plane of FIG. 3 may correspond to an example of a combined structure. The structure may be formed by combining a spherical partial structure corresponding to the reference object 311 and a flat partial structure corresponding to the reference plane. When the reference plane is unknown, a pose, a shape, and a material thereof may be determined through plane detection. Plane detection may be performed by a plane detection model. The plane detection model may be a machine learning model (for example, a neural network model) that is trained in advance to generate a plane detection result based on the input image 310. If the shape of the plane is assumed to be flat, the shape in the plane information may not be considered.

A rendering result 320 may be derived based on light information, object information, and plane information. The rendering result 320 may include a virtual object 321, a shading 324 of the virtual object 321, and shadows 322 and 323 of the virtual object 321. The shading 324 may be derived through a shading rendering scheme, and the shadows 322 and 323 may be derived through a shadow rendering scheme. The rendering result 320 may be formed through the fusion of the shading 324 and the shadows 322 and 323.

The rendering result 320 may be compared with the input image 310, and a light estimation model may be updated according to a comparison result (for example, a difference therebetween). For the comparison, pixel data of a predetermined region (for example, an object region) in the input image 310 may be compared with pixel data of a corresponding region in the rendering result 320. For example, pixel data representing a shading 314 and shadows 312 and 313 of the reference object 311 and pixel data representing the shading 324 and the shadows 322 and 323 of the virtual object 321 may be respectively compared pixel by pixel. For example, pixel data representing the shading 314 may be compared pixel by pixel to pixel data representing the shading 324, and pixel data representing the shadows 312 and 313 may be respectively compared pixel by pixel to pixel data representing the shadows 322 and 323.

Figure 4:
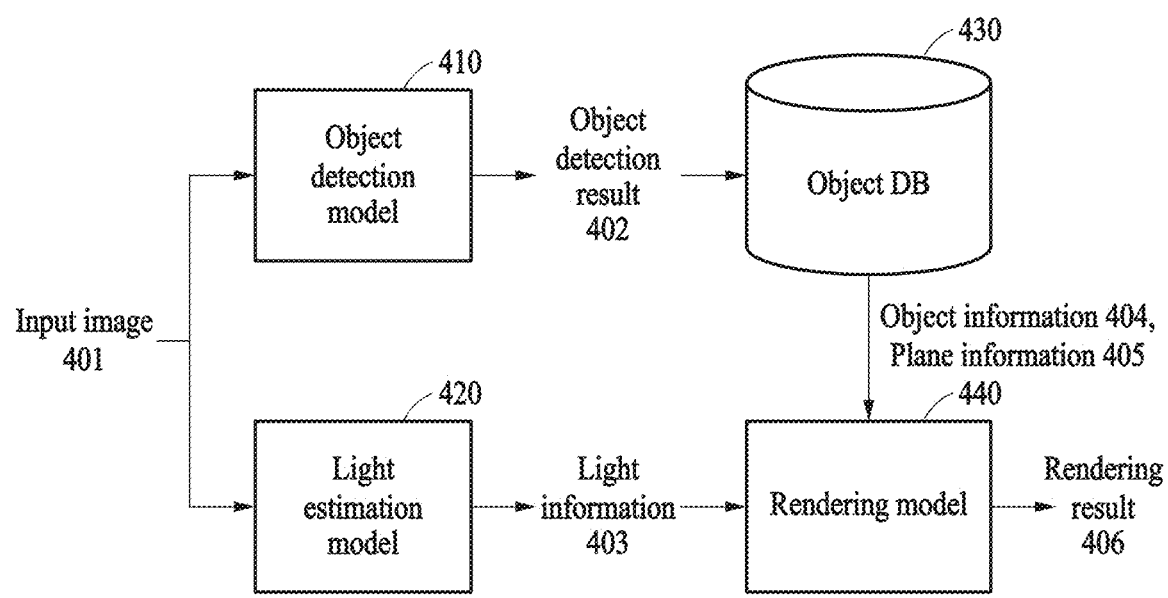
FIG. 4 illustrates an example of training using a known reference object and a known reference plane.

FIG. 4 illustrates an example of training using a known reference object and a known reference plane. Referring to FIG. 4, an object detection model 410 may detect a reference object from an input image 401 and generate an object detection result 402. The object detection model 410 may be a machine learning model (for example, a neural network model) that is trained in advance to generate the object detection result 402 based on the input image 401. A known object and a known plane may be combined to form a known structure, and such a known structure may be captured as a reference object in the input image 401.

The object detection result 402 may include information related to an object region corresponding to the reference object (for example, a position and a size of the object region). Information on the combined structure corresponding to the reference object may be stored in advance in an object database 430. For example, a shape and a material of the combined structure may be stored. The shape and the material of the combined structure may include a combination relationship (for example, a combination point) of the reference object and the reference plane, a shape and a material of the reference object (for example, a spherical partial structure), and a shape and a material of the reference plane (for example, a flat partial structure).

Object information 404 and plane information 405 may be determined based on the object detection result 402 and the object database 430. The object information 404 may include any one or any combination of any two or more of a pose, the shape, and the material of the reference object, and the plane information 405 may include any one or any combination of any two or more of a pose, the shape, and the material of the reference plane. For example, the pose of the reference object and/or the pose of the reference plane may be determined based on the object detection result 402 and/or the combination relationship, and the shape and the material of the reference object and/or the shape and the material of the reference plane may be determined based on the object database 403.

A light estimation model 420 may estimate light information 403 corresponding to the input image 401. A rendering model 440 may generate a rendering result 406 including a virtual object based on the light information 403, the object information 404, and the plane information 405. The light estimation model 420 may be trained based on a result of comparing the reference object in the input image 401 to the virtual object in the rendering result 406. Since the object information 404 and the plane information 405 provide realistic data about clues such as an object, shadings, a plane, and shadows based on known information, a training method of one or more embodiments may improve the accuracy of the light information 403 by reducing a difference between the reference object and the virtual object through the training of the light estimation model 420.

Figure 5:
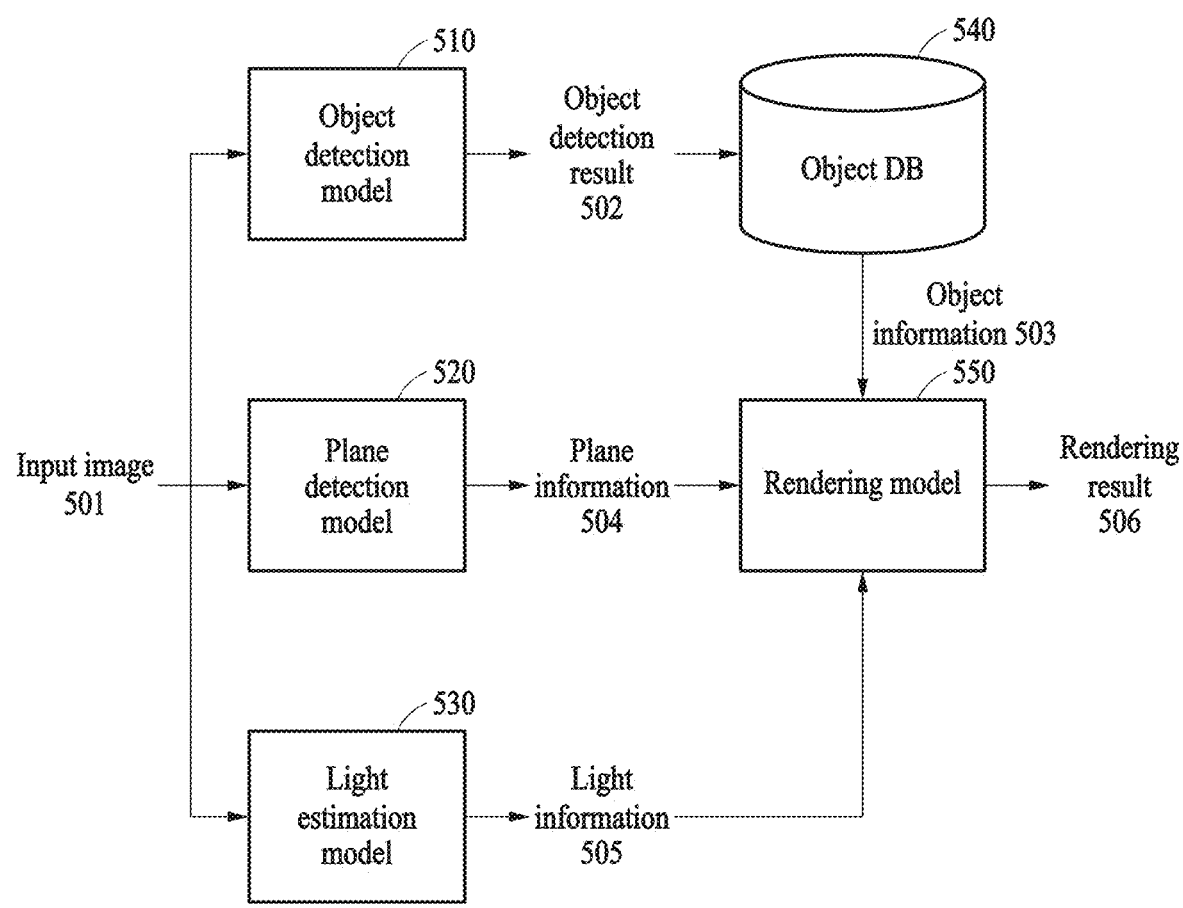
FIG. 5 illustrates an example of training using a known reference object and an unknown reference plane.

FIG. 5 illustrates an example of training using a known reference object and an unknown reference plane. Referring to FIG. 5, an object detection model 510 may detect a reference object from an input image 501 and generate an object detection result 502. The object detection model 510 may be a machine learning model (for example, a neural network model) that is trained in advance to generate the object detection result 502 based on the input image 501. A known object (for example, a known spherical object) may be captured as a reference object of the input image 501.

The object detection result 502 may include information related to an object region corresponding to the reference object (for example, a position and a size of the object region). Information on the reference object may be stored in advance in an object database 540. For example, a shape and a material of the reference object may be stored.

Object information 503 may be determined based on the object detection result 502 and the object database 540. The object information 503 may include any one or any combination of any two or more of a pose, the shape, and the material of the reference object. For example, the pose of the reference object may be determined based on the object detection result 502, and the shape and the material of the reference object may be determined based on the object database 540.

A plane detection model 520 may detect a reference plane from the input image 501 and generate plane information 504 based on a plane detection result. The plane detection model 520 may be a machine learning model (for example, a neural network model) that is trained in advance to generate the plane detection result from the input image 501. The plane information 504 may include any one or any combination of any two or more of a pose, a shape, and a material of the reference plane.

A light estimation model 530 may estimate light information 505 corresponding to the input image 501. A rendering model 550 may generate a rendering result 506 including a virtual object based on the light information 505, the object information 503, and the plane information 504. The light estimation model 530 may be trained based on a result of comparing the reference object in the input image 501 to the virtual object in the rendering result 506. Since the object information 503 and the plane information 504 provides realistic data about clues such as an object, shadings, a plane, and shadows based on known information and plane detection, a training method of one or more embodiments may improve the accuracy of the light information 505 by reducing a difference between the reference object and the virtual object through the training of the light estimation model 530.

Figure 6:
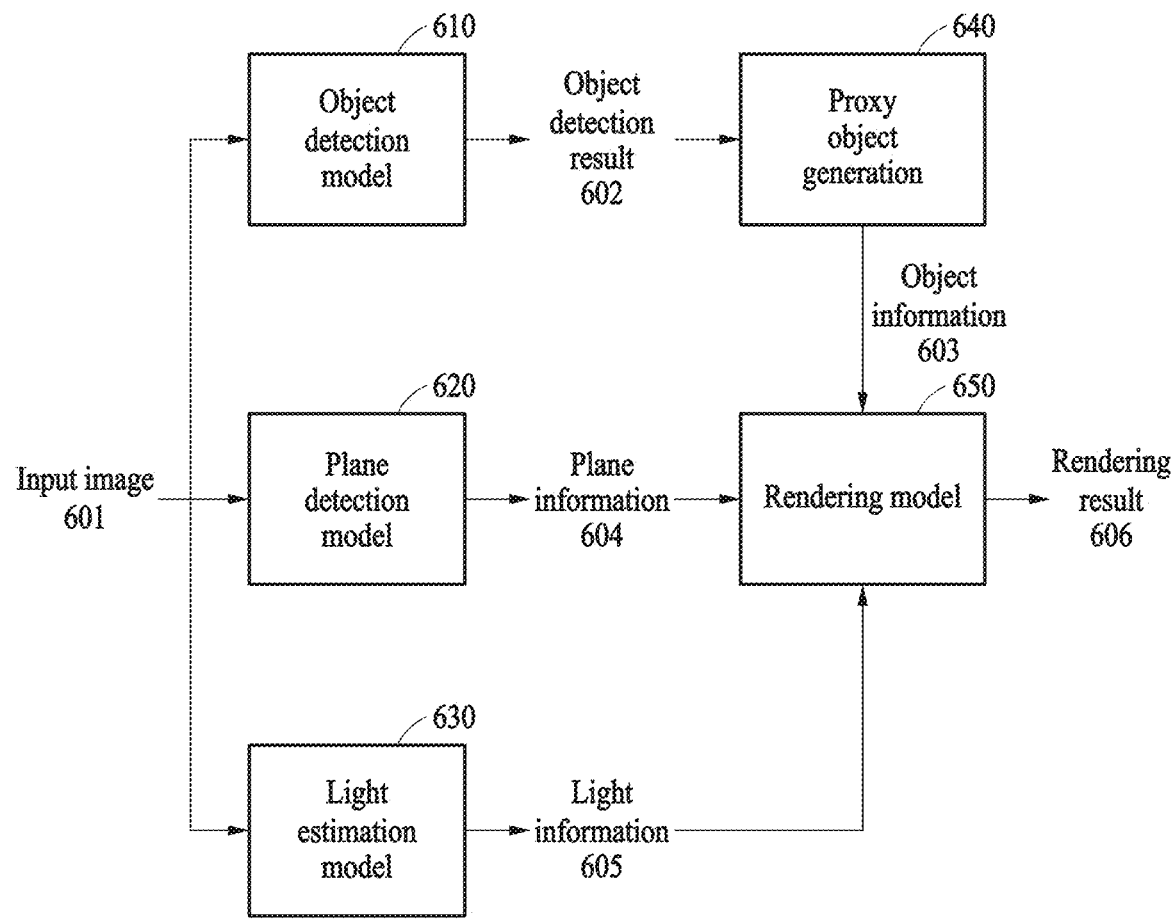
FIG. 6 illustrates an example of training using an unknown reference object and an unknown reference plane.

FIG. 6 illustrates an example of training using an unknown reference object and an unknown reference plane. Referring to FIG. 6, an object detection model 610 may detect a reference object from an input image 601 and generate an object detection result 602. The object detection model 610 may be a machine learning model (for example, a neural network model) that is trained in advance to generate the object detection result 602 based on the input image 601. The input image 601 may include an unknown reference object and an unknown reference plane. In other words, the input image 601 may be a normal image, and may be collected through various channels such as a web, a video platform, and a photo community.

The object detection result 602 may include information related to an object region corresponding to the reference object (for example, a position and a size of the object region). A proxy object may be generated based on the object detection result 602. Block 640 may denote an operation of generating the proxy object. For example, the proxy object may be a cube, a cylinder, a point cloud, or the like. Information on the proxy object may be stored in advance in an object database. For example, a shape and a material of the proxy object may be stored.

Object information 603 may be determined based on the information on the proxy object. The object information 603 may include any one or any combination of any two or more of a pose, the shape, and the material of the proxy object. For example, the pose of the proxy object may be determined based on the object detection result 602, and a shape and a material of the reference object may be determined based on the shape and the material of the proxy object. In other words, the shape and the material of the proxy object may substitute for the shape and the material of the reference object. Rather than determining information (a shape, a material, and the like) of an unknown target object, using information a known proxy object may be more effective for rendering and training. In some examples, a shadow may be used. A shadow may provide a decisive clue even with information of a rough characteristic such as a direction, and thus, using a proxy object may be more effective.

A plane detection model 620 may detect a reference plane from the input image 601 and generate plane information 604 based on a plane detection result. The plane detection model 620 may be a machine learning model (for example, a neural network model) that is trained in advance to generate the plane detection result from the input image 601. The plane information 604 may include any one or any combination of any two or more of a pose, a shape, and a material of the reference plane.

A light estimation model 630 may estimate light information 605 corresponding to the input image 601. A rendering model 650 may generate a rendering result 606 including a virtual object based on the light information 605, the object information 603, and the plane information 604. The rendering model 650 may render the virtual object corresponding to the proxy object, a shading of the virtual object, and a shadow of the virtual object. The light estimation model 630 may be trained based on a result of comparing the reference object in the input image 601 to the virtual object in the rendering result 606. The reference object and the virtual object may have different shapes and materials, but a meaningful training direction may be suggested through the use of the proxy object and the shadow.

Figure 7:
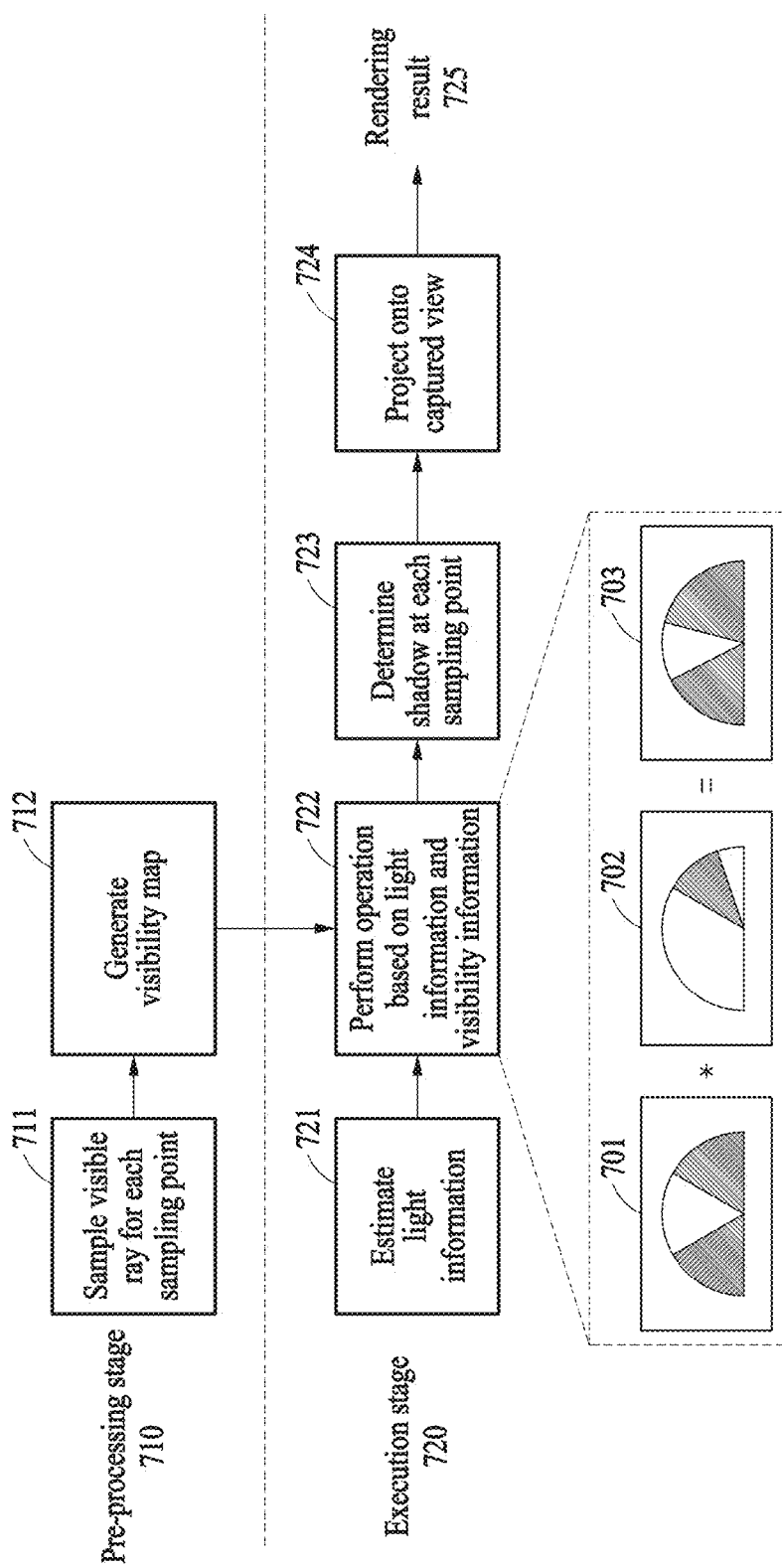
FIG. 7 illustrates an example of shadow rendering.

FIG. 7 illustrates an example of shadow rendering. A shadow of a virtual object may be rendered through fusion between light information and visibility information. When a reference object and a reference plane are a known combined structure, visibility information may be predetermined in a pre-processing stage 710. Then, the visibility information may be fused with light information in an execution stage 720 in which rendering is performed. By securing the visibility information in advance, rendering operations and time may be reduced.

Referring to FIG. 7, in operation 711, visible rays may be sampled for each sampling point. Sampling points may be defined on a reference plane, and visible rays incident in various directions may be defined for each sampling point. In operation 712, a visibility map may be generated based on a sampling result.

The visibility map may include occlusion ratios of the visible rays at each of the plurality of sampling points. For example, if a reference object occludes a direction of incidence of a ray at a sampling point, the ray may have an occlusion ratio of 1.0. If there is no obstacle occluding an incidence of another ray at the sampling point, the another ray may have an occlusion ratio of 0.0. An occlusion ratio may be defined as a value between 1.0 and 0.0. However, the numerical range is only an example, and the occlusion ratio may be defined by other numerical ranges.

When an input image is provided in the execution stage 720, light information corresponding to the input image may be estimated, in operation 721. The light information may be estimated through a light estimation model. In operation 722, an operation may be performed based on the light information and visibility information. In operation 723, a shadow at each sampling point may be determined. More specifically, shadow information at each sampling point may be determined by fusing (for example, multiplying) visibility information and light information at each sampling point of the reference plane.

A graph 701 may indicate light information of one sampling point, a graph 702 may indicate visibility information of the sampling point, and a graph 703 may indicate a result of fusing the light information and the visibility information. The graphs 701 to 703 are cross-sections of hemispheres centered at a sampling point. In the hemispheres, white areas may indicate regions with light, and gray areas may indicate regions without light. The graph 701 may indicate that lighting is present in a predetermined range at 12 o'clock, and the graph 702 may indicate that an obstacle (a reference object) is present in a predetermined range at 1 o'clock.

When the light information of the graph 701 and the visibility information of the graph 702 are fused, shadow information of the graph 703 may be derived. The shadow information of the graph 703 may indicate that a portion of the lighting area is occluded by the obstacle (the reference object) and light is provided at the sampling point from the other area. The occluded portion may form a shadow. As such, when the shadow information at each sampling point is determined, shadow rendering may be performed by projecting the shadow information onto a captured view of the input image, in operation 724, such that a rendering result 725 may be determined.

Figure 8:
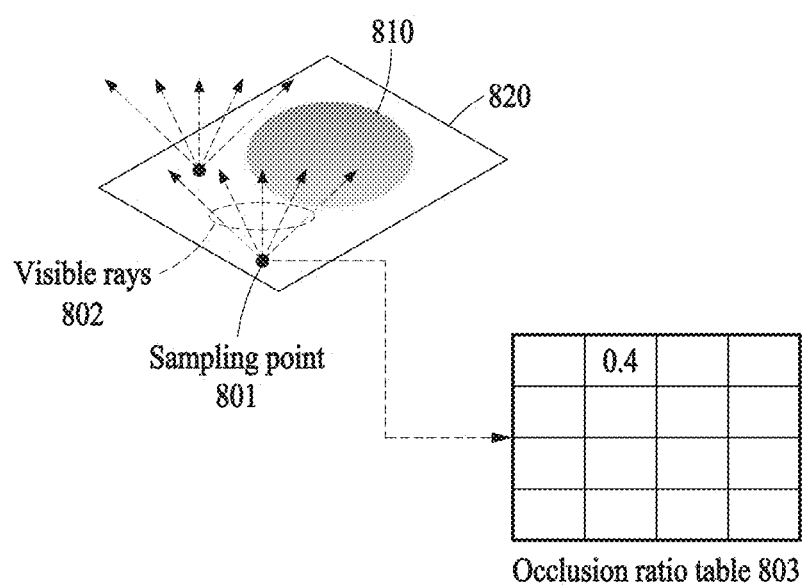
FIG. 8 illustrates an example of determining a visibility map.

FIG. 8 illustrates an example of determining a visibility map. Referring to FIG. 8, a reference object 810 and a reference plane 820 may be combined to form a known structure. A sampling point 801 may be defined on the reference plane 820, and visible rays 802 corresponding to a plurality of directions of incidence may be defined for the sampling point 801. Also, an occlusion ratio table 803 may be defined for the sampling point 801.

A plurality of sampling points may be defined on the reference plane 820, and an occlusion ratio table 803 may be defined for each sampling point. Each element of the occlusion ratio table 803 may indicate an occlusion ratio of a predetermined direction of incidence. For example, a center of the occlusion ratio table 803 may correspond to the sampling point 801, and a position of each element may correspond to each direction of incidence when the sampling point 801 is viewed vertically from above.

Depending on the position of the sampling point 801 on the reference plane 820 and the direction of incidence of a visible ray, one element may have complete visibility, and another element may have no visibility at all. For example, when a ratio of an element of the table is 0.4, it indicates that a ray of a corresponding direction of incidence is occluded by an obstacle (for example, the reference object 810) by 0.4. The occlusion ratio table 803 for all sampling points may be calculated in advance and stored as a visibility map. As described above, the visibility map may be calculated in a pre-processing step before model training and then utilized in a model training step. This may reduce the time required for shadow rendering.

Figure 9:
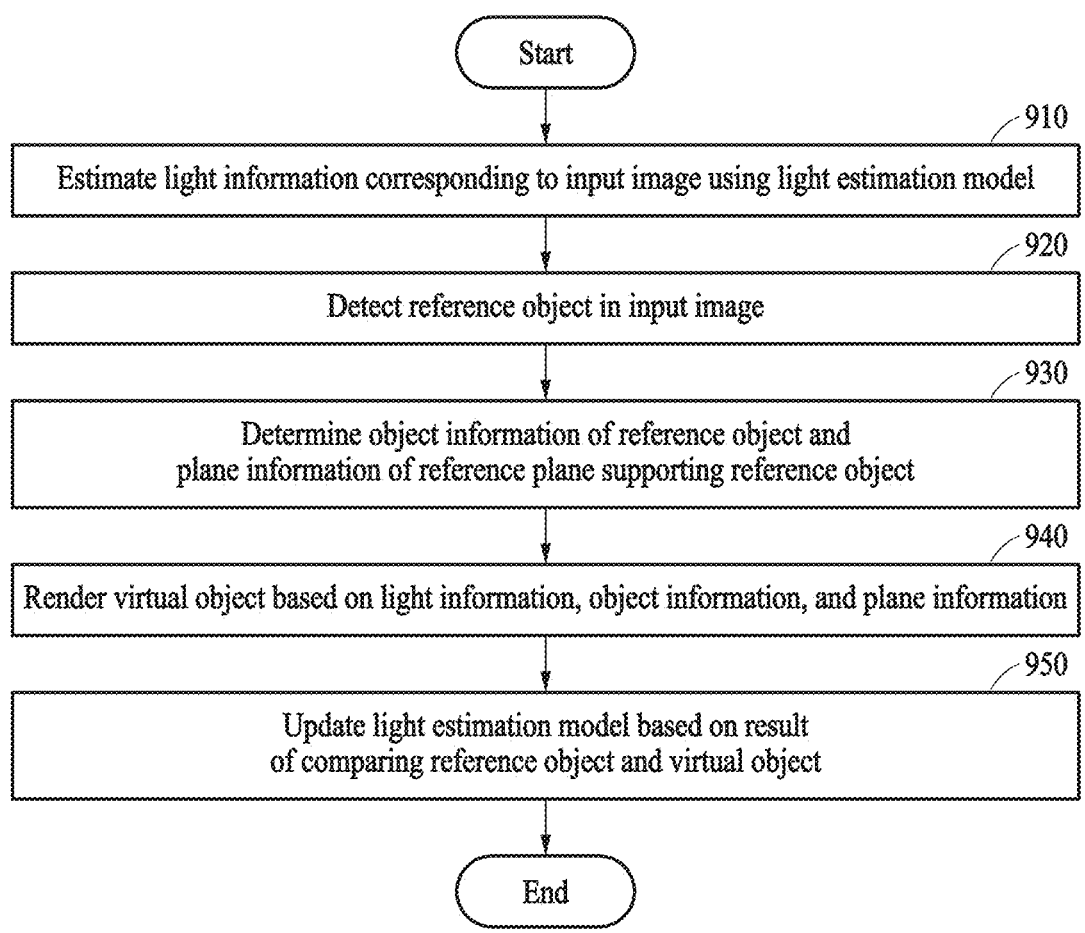
FIG. 9 illustrates an example of a training method.

FIG. 9 illustrates an example of a training method. Referring to FIG. 9, in operation 910, light information corresponding to an input image is estimated using a light estimation model. In operation 920, a reference object in the input image is detected. In operation 930, object information of the reference object and plane information of a reference plane supporting the reference object is determined. In operation 940, a virtual object is rendered based on the light information, the object information, and the plane information. In operation 950, a light estimation model is updated based on a result of comparing the reference object and the virtual object. In addition, the description provided with reference to FIGS. 1 to 8, 10, and 11 may apply to the training method.

Figure 10:
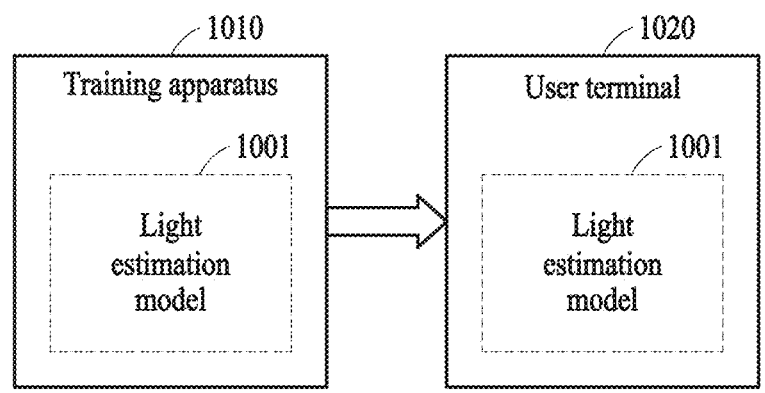
FIG. 10 illustrates an example of a training apparatus and a user terminal.

FIG. 10 illustrates an example of a training apparatus and a user terminal. Referring to FIG. 10, a training apparatus 1010 may train a light estimation model 1001. At least a portion of the light estimation model 1001 may be implemented by hardware modules and/or software modules. The training apparatus 1010 may perform the training operation described with reference to FIGS. 1 to 9.

For example, the training apparatus 1010 may estimate light information corresponding to an input image using the light estimation model 1001, detect a reference object in the input image, determine object information of the reference object and plane information of a reference plane supporting the reference object, render a virtual object corresponding to the reference object based on the light information, the object information, and the plane information, and update the light estimation model 1001 based on a result of comparing the reference object and the virtual object. The training device 1010 may render a shading of the virtual object and a shadow of the virtual object, and compare pixel data representing a shading of the reference object and a shadow of the reference object with pixel data representing the shadow of the virtual object and the shadow of the virtual object.

When the training of the light estimation model 1001 is completed, the light estimation model 1001 may be installed in a user terminal 1020. The user terminal 1020 may estimate light information corresponding to an input image using the light estimation model 1001, and provide a realistic virtual object using the light information. For example, light information may be applied to a virtual object in AR or CG. In addition, the description provided with reference to FIGS. 1 to 9 and 11 may apply to the training apparatus 1010, the light estimation model 1001, and the user terminal 1020.

Figure 11:
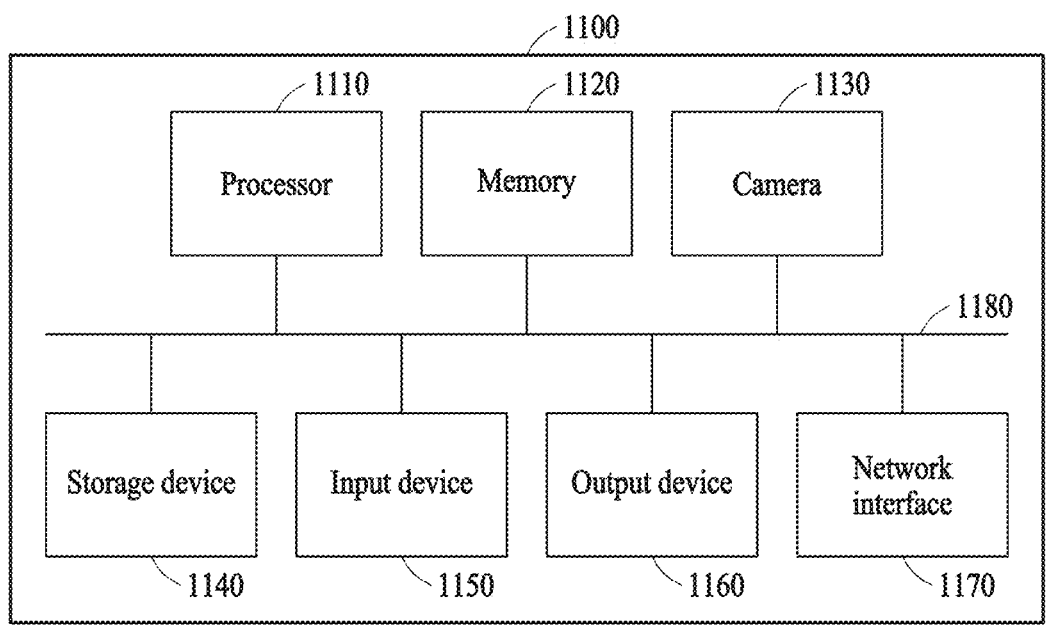
FIG. 11 illustrates an example of an electronic device.

FIG. 11 illustrates an example of an electronic device. Referring to FIG. 11, an electronic device 1100 may include a processor 1110, a memory 1120, a camera 1130, a storage device 1140, an input device 1150, an output device 1160, and a network interface 1170 that may communicate with each other through a communication bus 1180. For example, the electronic device 1100 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1100 may include, structurally and/or functionally, the training apparatus 1010 and/or the user terminal 1020 of FIG. 10.

The processor 1110 executes instructions or functions to be executed in the electronic device 1100. For example, the processor 1110 may process the instructions stored in the memory 1120 or the storage device 1140. The processor 1110 may perform the one or more operations described through FIGS. 1 to 10. The memory 1120 may include a computer-readable storage medium or a computer-readable storage device. The memory 1120 may store instructions to be executed by the processor 1110 and may store related information while software and/or an application is executed by the electronic device 1100.

The camera 1130 may capture a photo and/or a video. The photo and/or video may form an input image for a light estimation model. The storage device 1140 includes a computer-readable storage medium or computer-readable storage device. The storage device 1140 may store a more quantity of information than the memory 1120 for a long time. For example, the storage device 1140 may include a magnetic hard disk, an optical disk, a flash memory, a floppy disk, or other non-volatile memories known in the art.

The input device 1150 may receive an input from the user in traditional input manners through a keyboard and a mouse, and in new input manners such as a touch input, a voice input, and an image input. For example, the input device 1150 may include a keyboard, a mouse, a touch screen, a microphone, or any other device that detects the input from the user and transmits the detected input to the electronic device 1100. The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The light estimation apparatuses, object databases, training apparatuses, user terminals, processors, memories, cameras, storage devices, input devices, output devices, network interfaces, communication buses, light estimation apparatus 100, object database 430, object database 540, training apparatus 1010, user terminal 1020, processor 1110, memory 1120, camera 1130, storage device 1140, input device 1150, output device 1160, network interface 1170, communication bus 1180, and other apparatuses, units, modules, devices, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method for light estimation, comprising:
   estimating light information corresponding to an input image using a light estimation model;
   detecting a reference object in the input image;
   determining object information of the reference object and plane information of a reference plane supporting the reference object;
   rendering, based on the light information, the object information, and the plane information, a virtual object corresponding to the reference object and a shading of the virtual object and/or a shadow of the virtual object; and
   training the light estimation model by updating the light estimation model based on a result of comparing the reference object and the rendered virtual object,
   wherein the determining comprises, in response to the reference object and the reference plane being determined as a known combined structure, determining at least a portion of the object information and the plane information using an object database.

2. A processor-implemented method for light estimation, comprising:
estimating light information corresponding to an input image using a light estimation model;
detecting a reference object in the input image;
determining object information of the reference object and plane information of a reference plane supporting the reference object;
rendering, based on the light information, the object information, and the plane information, a virtual object corresponding to the reference object and a shading of the virtual object and/or a shadow of the virtual object; and
training the light estimation model by updating the light estimation model based on a result of comparing the reference object and the rendered virtual object,
wherein the result of comparing comprises a result of comparing pixel data representing a shading of the reference object and a shadow of the reference object and pixel data of the rendered shading of the virtual object and the rendered shadow of the virtual object.

3. The method of claim 2, wherein
the object information comprises any one or any combination of any two or more of a pose, a shape, and a material of the reference object, and
the plane information comprises any one or any combination of any two or more of a pose, a shape, and a material of the reference plane.

4. The method of claim 2, wherein the determining comprises, in response to the reference object being determined as a known object, determining at least a portion of the object information using an object database.

5. The method of claim 2, wherein the determining comprises, in response to the reference plane being determined as an unknown plane, determining the plane information by detecting the reference plane in the input image.

6. The method of claim 2, wherein the rendering comprises:
determining shadow information of each sampling point of the reference plane by fusing light information and visibility information of each sampling point; and
performing the rendering of the shadow of the virtual object by projecting the shadow information of each sampling point of the reference plane onto a capture view of the input image.

7. The method of claim 6, wherein, in response to the reference object and the reference plane being determined as a known combined structure, the visibility information is predetermined for rendering a shadow of the combined structure.

8. The method of claim 2, wherein the updating comprises updating the light estimation model to reduce a difference between the reference object and the virtual object.

9. The method of claim 2, further comprising:
obtaining another image; and
estimating light information corresponding to the other image using the trained light estimation model.

10. A non-transitory computer-readable storage medium storing instructions that, when executed by one or more processors, configure the one or more processors to perform the method of claim 2.

11. The method of claim 2, wherein the rendering includes the rendering of the shading of the virtual object and the rendering of the shadow of the virtual object formed at a same time or at different times.

12. The method of claim 2, wherein the rendering includes fusing the rendered shading and the rendered shadow to generate a rendering result.

13. The method of claim 1, wherein the result of comparing comprises a result of comparing pixel data representing a shading of the reference object and a shadow of the reference object and pixel data of the rendered shading of the virtual object and the rendered shadow of the virtual object.

14. The method of claim 1, wherein a spherical partial structure corresponding to the reference object and a flat partial structure corresponding to the reference plane are combined to form the combined structure.

15. A processor-implemented method for light estimation, comprising:
estimating light information corresponding to an input image using a light estimation model;
detecting a reference object in the input image;
determining object information of the reference object and plane information of a reference plane supporting the reference object;
rendering, based on the light information, the object information, and the plane information, a virtual object corresponding to the reference object and a shading of the virtual object and/or a shadow of the virtual object; and
training the light estimation model by updating the light estimation model based on a result of comparing the reference object and the rendered virtual object,
wherein the determining comprises, in response to the reference object being determined as an unknown object, determining the object information based on information of a predetermined proxy object.

16. An apparatus for light estimation, comprising:
one or more processors configured to:
estimate light information corresponding to an input image using a light estimation model;
detect a reference object in the input image;
determine object information of the reference object and plane information of a reference plane supporting the reference object;
render, based on the light information, the object information, and the plane information, a virtual object corresponding to the reference object and a shading of the virtual object and/or a shadow of the virtual object; and
train the light estimation model by updating the light estimation model based on a result of comparing the reference object and the rendered virtual object,
wherein the result of comparing comprises a result of comparing pixel data representing a shading of the reference object and a shadow of the reference object and pixel data of the rendered shading of the virtual object and the rendered shadow of the virtual object.

17. The apparatus of claim 16, wherein, for the rendering, the one or more processors are further configured to:
determine shadow information of each sampling point of the reference plane by fusing light information and visibility information of each sampling point; and
perform the rendering of the shadow of the virtual object by projecting the shadow information of each sampling point of the reference plane onto a capture view of the input image.

18. The apparatus of claim 16, wherein, for the determining, the one or more processors are further configured to determine the object information based on information of a predetermined proxy object.

19. The apparatus of claim 16, wherein, for the updating, the one or more processors are further configured to update the light estimation model to reduce a difference between the reference object and the virtual object.

20. An electronic device, comprising:
a camera configured to generate an input image; and
one or more processors configured to:
estimate light information corresponding to the input image using a light estimation model;
detect a reference object in the input image;
determine object information of the reference object and plane information of a reference plane supporting the reference object;
render a virtual object corresponding to the reference object, a shading of the virtual object, and a shadow of the virtual object based on the light information, the object information, and the plane information; and
train the light estimation model by updating the light estimation model based on a result of comparing pixel data representing a shading of the reference object and a shadow of the reference object and pixel data representing the shading of the rendered virtual object and the shadow of the rendered virtual object.

21. The device of claim 20, wherein, for the determining, the one or more processors are further configured to determine the object information based on information of a predetermined proxy object.

22. A processor-implemented method for light estimation, comprising:
obtaining a second image; and
estimating second light information corresponding to the second image using a trained light estimation model,
wherein the light estimation model is trained by:
estimating light information corresponding to an input image using a light estimation model;
detecting a reference object in the input image;
determining object information of the reference object and plane information of a reference plane supporting the reference object;
rendering, based on the light information, the object information, and the plane information, a virtual object corresponding to the reference object and a shading of the virtual object and/or a shadow of the virtual object; and
updating the light estimation model based on the rendered shading and shadow of the virtual object and based on a result of comparing the reference object and the virtual object,
wherein the result of comparing comprises a result of comparing pixel data representing a shading of the reference object and a shadow of the reference object and pixel data of the rendered shading of the virtual object and the rendered shadow of the virtual object.

23. The method of claim 22, further comprising:
rendering a second virtual object corresponding to a second object in the second image, based on the second light information; and
superimposing the second virtual object on the second image to generate an augmented reality (AR).

24. A processor-implemented method for light estimation, comprising:
estimating light information corresponding to an input image using a light estimation model;
determining information of a reference object in the input image based on whether stored information corresponds to the reference object;
rendering, based on the light information and the information of the reference object, a virtual object corresponding to the reference object and a shading of the virtual object and/or a shadow of the virtual object; and
training the light estimation model by updating the light estimation model based on the rendered shading and shadow of the virtual object and based on a result of comparing the reference object and the rendered virtual object,
wherein the result of comparing comprises a result of comparing pixel data representing a shading of the reference object and a shadow of the reference object and pixel data of the rendered shading of the virtual object and the rendered shadow of the virtual object.

25. The method of claim 24, wherein
the stored information is of a predetermined object, and
the determining comprises determining the stored information to be the information of the reference object in response to the reference object corresponding to the predetermined object.

26. The method of claim 24, wherein the determining comprises, in response to the stored information corresponding to the reference object, determining the stored information to be the information of the reference object.

27. The method of claim 24, wherein the information of the reference object comprises either one or both of object information of the reference object and plane information of a reference plane supporting the reference object.

* * * * *